United States Patent [19]

Merkle

[11] 4,079,262

[45] Mar. 14, 1978

[54] MOBILE CURRENT CONSUMER DEVICE

[75] Inventor: Helmut Merkle, Bulach, Switzerland

[73] Assignee: Contraves AG, Zurich, Switzerland

[21] Appl. No.: 741,977

[22] Filed: Nov. 15, 1976

[30] Foreign Application Priority Data

Dec. 16, 1975 Switzerland ........................ 16311/75

[51] Int. Cl.[2] ............................................ H02P 9/04

[52] U.S. Cl. ............................. 290/1 B; 322/DIG. 1

[58] Field of Search ............... 123/41.56, 41.58, 41.59; 290/1 B; 310/58, 59, 60, 62, 63; 89/1.815; 322/DIG. 1; 237/12.3 A

[56] References Cited

U.S. PATENT DOCUMENTS

| | | | |
|---|---|---|---|
| 2,630,537 | 3/1953 | Wiegman et al. | 123/41.56 |
| 2,799,782 | 7/1977 | Armstrong et al. | 290/1 B |
| 3,418,485 | 12/1968 | Anderson et al. | 290/1 B |
| 3,536,928 | 10/1970 | Jones et al. | 290/1 B |
| 3,946,640 | 3/1976 | Baumann | 89/1.815 |

FOREIGN PATENT DOCUMENTS

| | | | |
|---|---|---|---|
| 1,574,912 | 12/1969 | France | 290/1 B |
| 2,411,514 | 9/1975 | Germany | 290/1 B |
| 170,340 | 2/1976 | Germany | 290/1 B |
| 1,476,492 | 2/1969 | Germany | 290/1 B |

*Primary Examiner*—William E. Wayner

*Attorney, Agent, or Firm*—Werner W. Kleeman

[57] ABSTRACT

A mobile current consumer device, especially a fire control device for artillery- and/or rocket weapons, comprising a current generator unit insertable into a receiving compartment thereof. In the installed condition of the current generator unit, at least two spatially separated cooling air currents can be delivered to the current generator unit, and removed in the form of heated air currents spatially separated from one another. The one cooling air current can be delivered to an internal combustion engine of the current consumer device provided with a blower by means of an air infeed channel having a suction opening facing in the direction of travel. Such air current is then removable as heated air from the cooling casing surrounding the engine through the floor of the current generator unit which is extensively open at the region of the engine and by means of at least one opening provided in the floor of the receiving compartment. The other cooling air current entering by way of a suction opening facing such direction of travel can be withdrawn by at least one blower arranged at a side opposite the rear wall of the current generator unit, through a diffuser equipped with a radial fan. This cooling air current is deliverable by the radial fan to an inner compartment of the current generator unit and is removable as heated air through the extensively open rear wall.

10 Claims, 3 Drawing Figures

FIG. 1
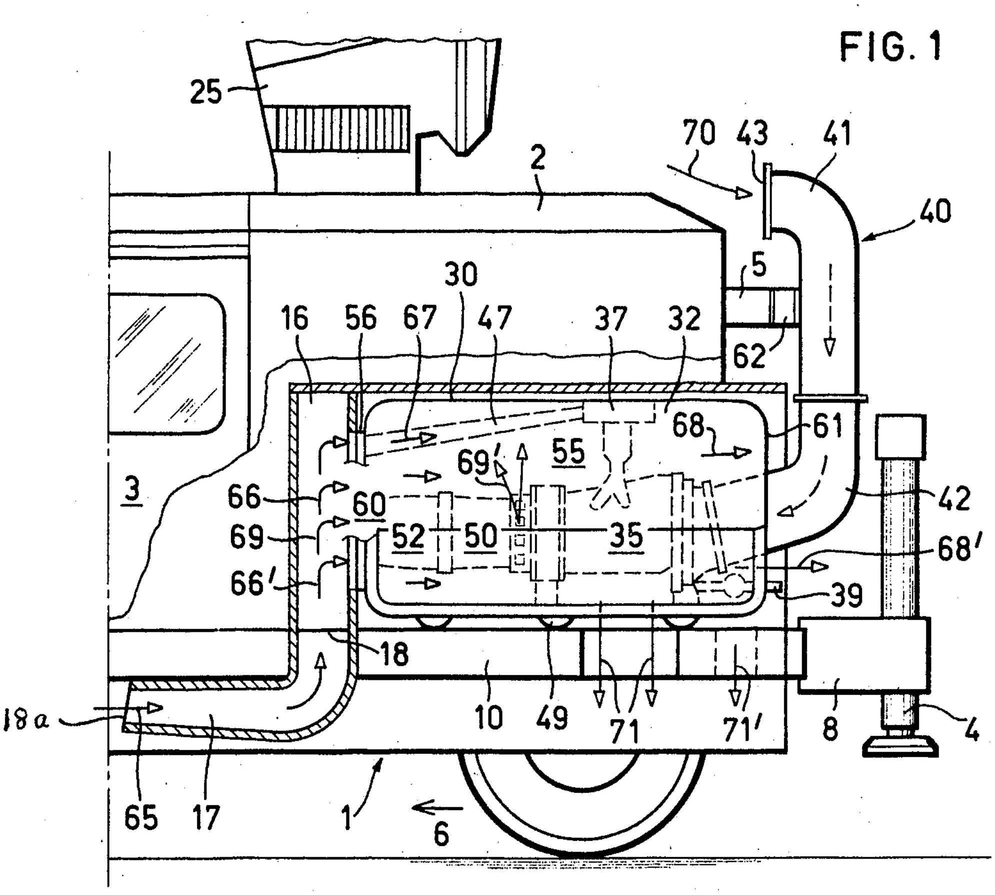
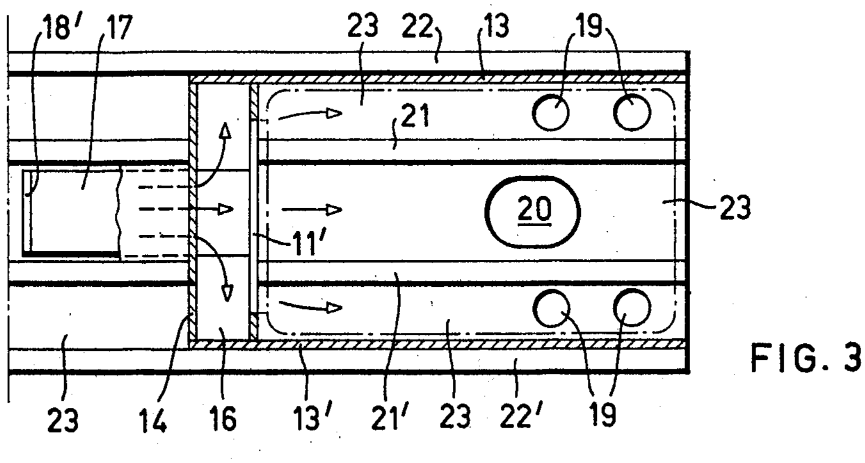
FIG. 3

MOBILE CURRENT CONSUMER DEVICE

BACKGROUND OF THE INVENTION

The present invention relates to a new and improved construction of a mobile current consumer device, especially a fire control device for artillery- and/or rocket weapons, comprising a current generator unit insertable into a receiving compartment of the current consumer device and possessing an internal combustion engine and a generator driven thereby.

A unit for supplying current is disclosed in German patent 1,476,492 which encompasses an internal combustion engine and a generator driven thereby incorporating a ventilator fixedly secured therewith. The ventilator delivers a current of cooling air to the internal combustion engine. In order to lower the noise level, the unit mounted to an undercarriage or chassis is surrounded by a casing assembled from a number of parts, constituting for instance a spiral-shaped labyrinth channel having one end opening within and the other end outside of the casing and through which the exhaust gases from the engine as well as the hot air delivered by the current supply unit can escape into the ambient atmosphere. The casing or box of such unit which is constructed as a labyrinth channel is complicated to fabricate and additionally relatively large in its external dimensions. A further drawback resides in the fact that the means needed for the operation of the current supply unit, such as for instance fuel tank, batteries and so forth, must be either positioned externally of the unit, or however, removed from a suitable operatively associated device.

Further, there has been disclosed a ventilator assembly in German Pat. No. 1,703,340 for a preferably armored-clad combat vehicle comprising a radial blower attached to a bracket which is driven by a hydrostatic motor as well as there being provided a heat exchanger. The radial blower is accessible by means of an opening arranged at the vehicle hull or well, and the opening is covered by a cover member articulated to the vehicle hull and provided with air infeed channels subdivided for the infeed and withdrawal of the cooling air. This ventilation or cooler assembly is provided with a hydraulic installation for cooling the operating means or, however, for recooling the cooling water of a fuel combustion engine.

Additionally, with the motor vehicle disclosed in German Pat. No. 2,411,514, there is arranged within a compartment provided with an air inlet and an air outlet a drive block or assembly formed by a motor, a coupling, and a transmission. A cooling blower shaft or chute having a blower driven by the motor is arranged at one of both sides of the compartment between the compartment wall and the vehicle body wall, in order to thereby achieve the average room temperature in the compartment as well as adequate cooling of the engine.

SUMMARY OF THE INVENTION

It is a general object of the present invention to provide a new and improved construction of a mobile current consumer device having a novel arrangement of current generator unit and associated cooling means.

Another significant object of the present invention aims at providing for a current generator unit which can be housed in a relatively small receiving compartment of a current consumer device, especially a fire control device, an optimum infeed of ventilation- and cooling air, without there occurring any admixing of the sucked-up cooling air with the withdrawn hot air.

In keeping with the foregoing objective, it is another object of the present invention, to provide a current generator device which, under the most extreme operating conditions of the fire control device, insures that both during the preparatory phase during travel as well as also during the operating phase during standstill, there is adequate ventilation and cooling of the current generator unit, and thus provides for reliable energy supply of the entire fire control device with maximum operational reliability.

Now in order to implement these and still further objects of the invention, which will become more readily apparent as the description proceeds, the mobile current consumer device of the invention is manifested by the features that in the installed or mounted condition of the current generator unit, at least two spatially separated cooling air currents sucked-up from the ambient space can be infed thereto and removed therefrom as heated or hot air spatially separated from one another. The one cooling air current is delivered by means of an air infeed channel located above the fire control device- superstructure and provided with a suction opening facing in the direction of travel, to the internal combustion engine equipped with for instance an axial blower. This air current is removable as heated air from the cooling casing surrounding the internal combustion engine by means of the floor of the current generator unit which is extensively open at the region of the engine as well as through at least one opening provided at the floor of the current generator unit- receiving compartment. Further, the other cooling air current entering through a suction opening likewise facing in the direction of travel can be infed by at least one blower arranged at a side opposite the rear wall of the current generator unit, through a diffuser of such current generator unit equipped with a radial ventilator or fan and from the radial ventilator is then supplied to the substantially box-like inner compartment and withdrawn as heated air through the extensively open rear wall.

In French Pat. No. 1,574,912 it is already known in the case of a current generator unit to deliver cooling air sucked-up from the ambient atmosphere from the rear side of an internal combustion engine attached to a base frame arranged in a housing box as well as to a generator from the associated end face, and to withdraw the air as heated air through both of the housing side walls. However, with this proposal the laterally escaping hot air admixes with the cooling air sucked-up at the rear side for the engine, so that this unit only can remain in operation with certain limitations, i.e. must be freely exposed to sufficient cooling air-infeed, and thus, is not suitable for use in a fire control device.

According to a further aspect of the invention, the current consumer device is provided with a compartment which communicates with the ambient atmosphere by means of an air infeed channel arranged with its suction opening facing in the direction of travel. One compartment wall has an opening and is constructed for the connection thereat of a sealing frame arranged at the current generator unit. Additionally, the sealing frame is provided and constructed for the reception of further blowers for the ventilation of the box-like inner compartment and for the infeed of fresh air to the carburetor of the internal combustion engine.

According to a still further construction, at the floor of the current consumer device is provided at the region of the internal combustion engine additional outlet openings through which there can be withdrawn both the hot air delivered by the engine-cooling casing as well as also the hot air coming from the box-like inner compartment.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view, partially in section, of a fire control device illustrated as a vehicle superstructure having mounted therein a current generator unit;

FIG. 3 is a top plan view, partially in section, of the vehicle chassis shown in FIG. 2, taken substantially along the line III—III thereof.

DETAILED DESCRIPTION OF THE PREFERRED EMBODIMENTS

Figure 2:
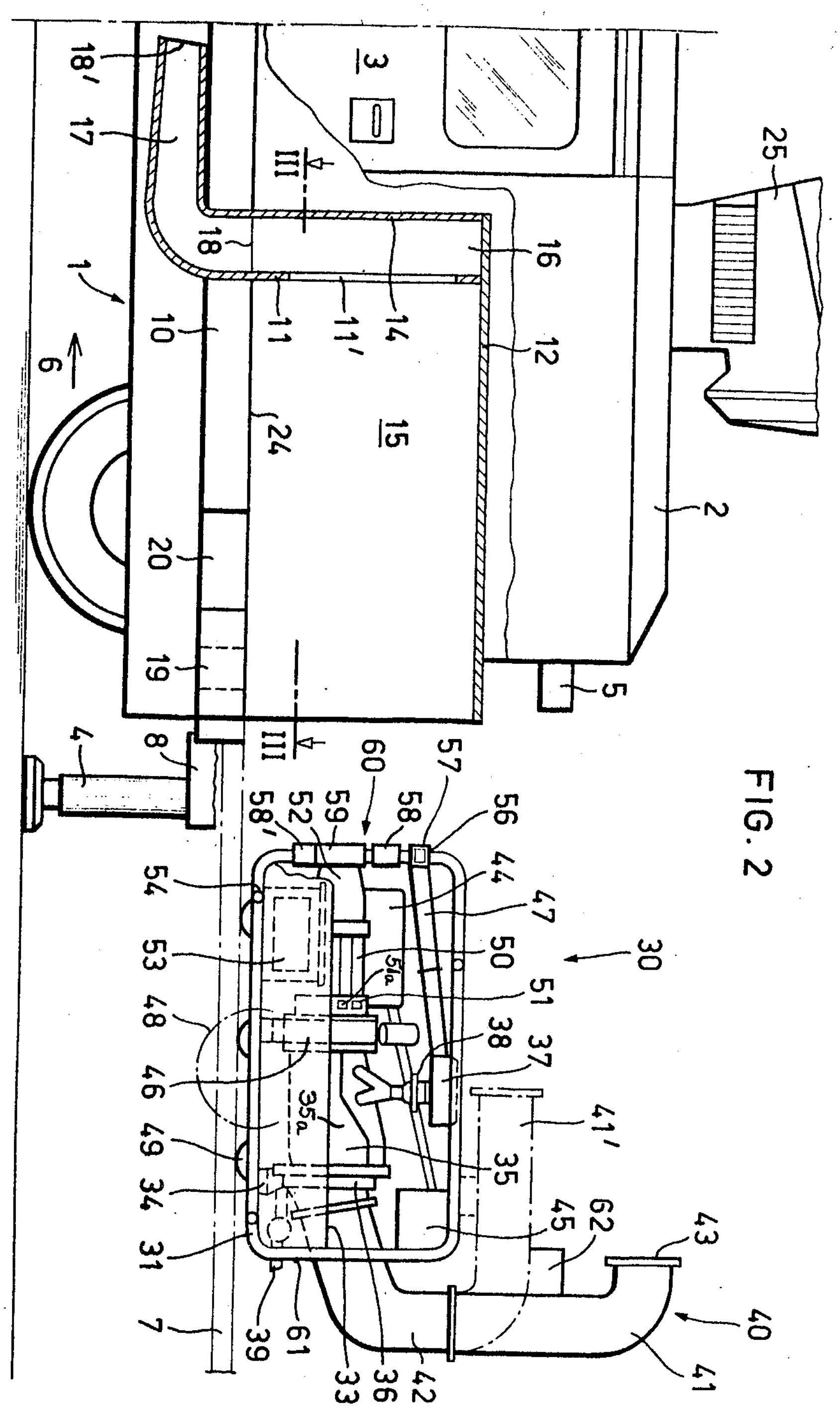
FIG. 2 is a side view of the fire control device of FIG. 1, illustrated partially in section, however with the current generator unit shown in its retracted or pulled-out position.

Describing now the drawings, it is to be understood that reference character 1 generally designates as the current consumer device or fire control device a motor vehicle or vehicle tractor having a vehicle superstructure or body 2. The vehicle superstructure or body 2 is attached by any suitable means to a substantially box-shaped vehicle chassis 10 composed of longitudinal supports 21, 21', 22, 22', and plate members 23, for instance formed of sheet metal.

The current consumer device, in particular the fire control device for artillery- and/or rocket weapons, possesses a schematically illustrated radar tower 25 secured by conventional and therefore not particularly illustrated means to the vehicle body or superstructure 2. This radar tower 25 is equipped, for instance, with a search radar antenna, a tracking- and position-finding antenna, a transmitter antenna, and possibly also television cameras and laser distance measuring devices. The radar tower 25 can be operated from a not particularly illustrated operating compartment or space which is accessible by means of a door 3. During travel such radar tower 25 can be rocked into the vehicle superstructure or body 2. Such an arrangement has been shown for instance in the commonly assigned U.S. Pat. No. 3,946,640 granted Mar. 30, 1976.

Continuing, at the vehicle chassis 10 there are attached to the pivotable struts or stays 8 hydraulically actuatable supports 4 by means of which the vehicle can be raised and aligned during its positioning. In FIG. 1 there is illustrated in side view and partially in sectional view, the vehicle superstructure or body 2 with the therein mounted current generator unit 30, and in FIG. 2 there is likewise shown, partially in sectional view, the vehicle body or superstructure 2, but this time with the current generator unit 30 retracted or pulled-out of the vehicle superstructure or body 2. Further, there will be recognized a compartment 15 provided in the vehicle body 2 as well as a chamber 16 having a suction opening 18 and separated by means of an intermediate wall or partition 11 from the compartment 15. The current generator unit 30, as shown in FIG. 2, is preferably pulled onto a ramp 7 suspended in appropriate devices provided at the vehicle 1 in order to enable mounting and dismantling of the current generator unit 30. To the extent that a ramp 7 is used, a possible advantageous construction thereof has been disclosed in the commonly assigned, copending U.S. application Ser. No. 741,978, filed Nov. 15, 1976, entitled "Collapsible Loading Ramp or the Like".

The compartment 15 formed by two side walls 13, 13', a cover wall or ceiling 12, an end wall 14, the intermediate wall 11 having the opening 11' as well as by a chassis floor 24 consisting of the sheet metal plates or plate members 23 or the like and the supports 21, 21', and 22, 22', advantageously is designed to have such a size that the current generator unit 30 just has space therein. Further, the floor 24 is preferably constructed such that the sheet metal plates 23 are attached at a certain spacing from the upper edge of the longitudinal supports 21, 21' and 22, 22' at the side walls, so that at least the upper edges of both supports 21, 21' protrude, thereby serving as guide- and slide rails for the current generator unit 30 which is provided with suitable travelling rolls 49 or equivalent structure.

Between both of the supports 21, 21' there is preferably arranged an air channel 17 flow communicating with the compartment 16 and having an opening 18' facing or aligned in the direction of travel 6 of the vehicle. The lowermost location of the air channel 17 is provided with standard discharge holes or bores and the opening 18' with a suitable screen or wire mesh, generally indicated by reference character **18*a*. However, according to a variant of the invention, the possibility also exists of providing the chassis frame 10 at the region of the compartment 16 merely with an appropriately dimensioned air inlet opening 18. In spaced relation from the opening 18 or 18', as the case may be, there are arranged at the chassis floor 24 between the supports 21, 22, and 21', 22' preferably two respective continuous openings 19 communicating with the atmosphere or surroundings and between both of the supports 21, 21' at least one opening 20** likewise communicating with the atmosphere.

The current generator unit 30 shown standing upon the ramp 7 and only schematically illustrated with its most essential components, will be seen to comprise a frame 31 composed of two substantially parallely arranged tubes or pipes or the like, interconnected by the transverse supports 54. This frame 31 serves to house an internal combustion engine 35 provided for instance with an axial blower 36, a carburetor 38, a filter 37 and an exhaust pipe or exhaust 39. The internal combustion engine 35 is mounted upon suitably arranged vibration dampers or shock absorbers 34. At one side, there is attached to the engine 35 a coupling housing 46 as well as a generator 50 provided with a ventilator or fan 51 and, at the other side, there is attached to the axial blower 36 of the engine 35 an air infeed channel or duct 40 possessing a suction connection or pipe 42 and a fresh air flue or stack 41 having a suction opening 43. Furthermore, there will be recognized that there is provided a battery 53, a fuel tank or container 44, an infeed line or conduit 47 leading to the filter 37 as well as a control or switching cabinet 45. As far as the engine 35 is concerned, such is preferably a commercially available air-cooled internal combustion engine having a merely schematically indicated, conventional cooling casing or jacket **35*a* surrounding the engine- and cylinder block. At the side opposite the air infeed channel 40 there is arranged in a connection and sealing frame 56** secured between both of the tubes of the composite frame 31, an air infeed device 60 having at least one blower 59, preferably however, provided with a number of blowers 58, 58' arranged in offset relationship in the sealing frame 56 as well as having an opening 57 for the infeed line 47 leading to the filter 37.

In FIGS. 1 and 3, there is illustrated by means of the arrows 65–71 the infeed of the fresh- and cooling air to the internal combustion engine 35 on the one hand, and to the generator 50 on the other hand, as well as to the box-like inner compartment 55 of the current generator device 30. This current generator device 30 is sealingly inserted into the opening 11' of the intermediate wall 11 by means of the frame 56 which is provided at its front side. Further, current generator device 30 has a hood 32 (FIG. 1) and is partially lined with the sheet metal side plates 33 (FIG. 2). The rear side 61 opposite the frame 56 is extensively open.

The engine 35 has delivered thereto from the outside a cooling air current through the channel 40, as indicated by the arrow 70, this cooling air current being sucked-up by the axial blower 36 and thereafter delivered through the cooling casing 35*a* of the finned cylinder block, this cooling casing, as mentioned, being arranged at the engine block. This air current 70 then is conducted in the form of heated air through the floor of the current generator unit 30 which is extensively open at the region of the engine 35 and thereafter lead through the openings 19, 20 into the surrounding atmosphere along the path as indicated by the arrows 71, 71'. The openings 19 are preferably arranged directly beneath the cylinder block and dimensioned such that the heated air current can readily reach the ambient atmosphere. According to a not particularly illustrated variant embodiment, the possibility exists of providing at the openings 19, 20 in each case a sheet metal air guide plate arranged opposite to the direction of travel 6, by means of which there is imparted to the outgoing air current a predetermined flow direction.

The arrow 65 schematically illustrates the manner in which a cooling air current is delivered from the ambient space or surroundings through the channel 17 into the chamber 16 and from that location, as indicated by the arrow 69, to the blower 59 and further by means of a diffuser 52 to the generator 50. At the side opposite the diffuser 52, there is secured to the generator 50, the ventilator or fan 51 which infeeds the air 69' arriving from the generator 50 to the inner or internal compartment 55. The fan 51 is preferably provided at its outlet openings 51*a* with suitable not particularly illustrated air guide plates directed towards the rear wall 61.

For the intensive cooling and ventilation of the current generator unit 30, there is delivered from the chamber or compartment 16 further cooling air designated by the arrows 66, 66' to the blowers 58, 58' arranged in offset manner in the frame 56. Consequently, the cooling air departing from the blowers 58, 58' contacts the hot air 69' emanating from the ventilator or fan 51, flows through the entire inner compartment 55 and then either along the paths designated by the arrows 68, 68' through the predominantly or extensively open rear wall and/or however also along the paths indicated by the arrows 71, 71' into the surrounding atmosphere.

The carburetor 38 of the engine 35 is supplied with fresh air, as indicated by the arrow 67, through the filter 37 by means of the infeed line 47 connected with the air infeed device 60.

As best seen by referring to FIGS. 1 to 3, the cooling air-suction openings 18 or 18' and 43 required for the operation of the current generator unit 30 are arranged to be spatially offset with regard to the outlet openings 19, 20 and the rear side 61. Consequently, there is prevented admixing of the sucked-up cooling air with the hotter exhaust 68, 68' and 71, 71' departing from the outlet openings 19, 20 and the rear side 61. The air 68, 68' effluxing from the rear side 61 of the current generator unit 30 however advantageously admixes with the exhaust gas emanating from the exhaust pipe 39, thereby extensively avoiding any undesired noxious odors.

The current generator unit 30 can be employed both in its mounted condition as shown in FIG. 1 as well as also for tactical reasons in spaced relationship from the current consumer device where it is freely located upon the involved terrain. The arrangement of the air infeed devices 40, 60 responsible for the ventilation or aeration of the entire current generator unit 30, affords for both possibilities of use optimum cooling, and thus, a functionally reliable current supply.

When using the current generator unit 30 in the terrain, after the brackets 5, 62 interconnected by not particularly illustrated means and secured to the superstructure 2 and the flue 41 have been disconnected from one another, the current generator unit 30 can be pulled along the ramp 7, equipped with the wheels 48 and then placed upon the ground. Additionally, during this mode of use it is advantageous to mount the flue or stack 41 in the position 41' shown in phantom lines in FIG. 2.

The fuel tank 44 fixedly mounted at the current generator unit 30 possesses a filled quantity of fuel suitable for a given duration of operation of the internal combustion engine 35 and therefore the entire current generator unit 30. Refilling of the tank or container 44, something particularly necessary for longer operating periods and stationary arrangements of the current generator unit, can be accomplished both manually as well as automatically from one or a number of reserve tanks. The manual refilling is associated with the possible danger of fire due to spilling-out of the fuel.

With an automatic refueling device (not shown) there are typically provided in the fuel tank 44 two conventional floats, one of which turns-on a current circuit upon reaching an adjustable minimum fuel level and activates a pump, which then pumps fuel out of a reserve tank into the fuel tank 44 for such length of time until the second appropriately arranged level float cuts-off the current circuit and stops the pump.

While there are shown and described present preferred embodiments of the invention, it is to be distinctly understood that the invention is not limited thereto, but may be otherwise variously embodied and practiced within the scope of the following claims. Accordingly,

What is claimed is:

1. A mobile current consumer device, especially a fire control device for artillery- and/or rocket weapons, comprising:
   - means providing a receiving compartment for the current consumer device;
   - a current generator unit insertable into the receiving compartment of the current consumer device;
   - said current generator unit containing an internal combustion engine and a generator driven thereby;
   - means for delivering to the current generator unit when housed in the receiving compartment of the current consumer device, at least two spatially separate cooling air currents sucked-up from the surrounding atmosphere and removable as heated air;

said current consumer device including a superstructure;

said means delivering said two cooling air currents including an air infeed channel provided with suction opening means arranged above the superstructure and facing in the direction of travel of the mobile current consumer device;

said air infeed channel delivering one of said cooling air currents to the internal combustion engine;

said means delivering said two cooling air currents further including air delivery means communicating with said current generator unit;

said air delivery means delivering the other of said air cooling currents to said current generator unit;

said internal combustion engine being provided with blower means and having a cooling casing surrounding the internal combustion engine;

said current generator unit having a floor which is extensively open at the region of the internal combustion engine;

said receiving compartment having a floor provided with at least one opening;

said one cooling air current being withdrawn as heated air from the cooling casing surrounding the internal combustion engine through said extensively open floor of the current generator unit and through said at least one opening of the floor of the receiving compartment;

a rear wall provided for said current generator unit, at least one blower arranged at a side of said current generator unit opposite said rear wall, said generator being provided with a fan, a diffuser for the generator, said current generator unit having an inner compartment containing said fan;

said air delivery means for said other cooling air current being provided with a suction opening facing in the direction of travel of the mobile current consumer device;

said other cooling air current entering by means of said suction opening facing in the direction of travel of the mobile current consumer device and being delivered by means of the blower through the diffuser to the generator and from the fan to said internal compartment and removable as heated air through said rear wall.

2. The mobile current consumer device according to claim 1, further including:

additional blowers communicating with the ambient atmosphere through said suction opening;

frame means secured to the current generator unit;

said blowers being mounted in offset arrangement at said frame means and serving for ventilating said internal compartment.

3. The mobile current consumer device according to claim 1, wherein:

said air delivery means comprises an air chamber arranged within said superstructure;

an intermediate wall separating the air chamber from the receiving compartment;

said air chamber communicating by means of said suction opening with the ambient atmosphere.

4. The mobile current consumer device according to claim 1, wherein:

the superstructure includes an intermediate wall having an opening;

frame means provided for said current generator unit;

said current generator unit being sealingly insertable together with the frame means into said opening of the intermediate wall.

5. The mobile current consumer device according to claim 1, further including:

a pair of vehicle chassis supports;

said air delivery means including a chamber communicating with a channel, said channel communicating with said suction opening;

said channel being arranged between said two supports.

6. The mobile current consumer device according to claim 1, further including:

means defining exhaust openings arranged in spaced relationship from said suction opening at the floor or the vehicle body below the internal combustion engine.

7. The mobile current consumer device according to claim 1, wherein:

the air infeed channel comprises a suction connection attached to the blower means of the internal combustion engine and a fresh air suction flue secured to said suction connection.

8. The mobile current consumer device according to claim 1, wherein:

said blower means is an axial blower.

9. The mobile current consumer device according to claim 1, wherein:

said rear wall is extensively open to its surroundings.

10. A mobile current consumer device, especially a fire control device for artillery- and/or rocket weapons, comprising:

means providing a receiving compartment;

a current generator unit insertable into said receiving compartment;

said current generator unit containing an internal combustion engine and a generator driven thereby;

means for delivering to the current generator unit when housed in said receiving compartment, at least two spatially separate cooling air currents sucked-up from the surrounding atmosphere and removable as heated air;

said means delivering said two cooling air currents including an air infeed channel provided with suction opening means;

said air infeed channel delivering one of said cooling air currents to the internal combustion engine;

said means delivering said two cooling air currents further including air conducting means communicating with said current generator unit;

said air conducting means delivering the other of said air cooling currents to said current generator unit;

said current generator unit having a floor which is open at the region of the internal combustion engine;

said receiving compartment having a floor provided with at least one opening;

said one cooling air current being withdrawn as heated air from the internal combustion engine through said open floor of the current generator unit and through said at least one opening of the floor of the receiving compartment;

said current generator unit having an inner compartment;

said air conducting means for said other cooling air current being provided with a suction opening;

said other cooling air current entering said current generator unit by means of said suction opening and being delivered to said internal compartment and removable as heated air therefrom.

* * * * *